(12) United States Patent
Stoeckl et al.

(10) Patent No.: US 8,469,850 B2
(45) Date of Patent: Jun. 25, 2013

(54) SUPERPOSITION TRANSMISSION

(76) Inventors: Dieter Stoeckl, Heideweg (AT); Heinz Aitzetmueller, Strass (AT)

( * ) Notice: Subject to any disclaimer, the term of this patent is extended or adjusted under 35 U.S.C. 154(b) by 356 days.

(21) Appl. No.: 12/793,664

(22) Filed: Jun. 3, 2010

(65) Prior Publication Data

US 2011/0015022 A1 Jan. 20, 2011

(30) Foreign Application Priority Data

Jun. 4, 2009 (AT) ................................ GM345/2009

(51) Int. Cl.
*F16H 47/04* (2006.01)
*F16H 37/02* (2006.01)

(52) U.S. Cl.
USPC .............................. 475/72; 475/207; 475/218

(58) Field of Classification Search
USPC ........................................................... 475/72
See application file for complete search history.

(56) References Cited

U.S. PATENT DOCUMENTS

| | | | |
|---|---|---|---|
| 3,855,879 A | 12/1974 | Delalio | |
| 3,918,325 A | 11/1975 | Frost | |
| 3,979,972 A | 9/1976 | Sakai et al. | |
| 4,373,359 A | 2/1983 | Ehrlinger et al. | |
| 5,643,122 A | 7/1997 | Fredriksen | |
| 5,667,452 A * | 9/1997 | Coutant | 475/81 |
| 6,315,691 B1 | 11/2001 | Fredriksen et al. | |
| 2006/0276291 A1 * | 12/2006 | Fabry et al. | 475/72 |
| 2008/0155974 A1 | 7/2008 | Aitzetmueller et al. | |
| 2008/0214351 A1 | 9/2008 | Katayama et al. | |
| 2010/0146960 A1 | 6/2010 | Calvert et al. | |

FOREIGN PATENT DOCUMENTS

| | | |
|---|---|---|
| CA | 2383121 A1 | 11/2000 |
| DE | 199 54 894 A1 | 12/2000 |
| DE | 10128 853 A1 | 12/2002 |
| EP | 2034221 A2 | 3/2009 |
| EP | 2213496 A2 | 8/2010 |

OTHER PUBLICATIONS

Espacenet English language abstract for DE 10128853 published Dec. 19, 2002.
Espacenet English language abstract for EP 2034221 A2 published Mar. 11, 2009.

* cited by examiner

*Primary Examiner* — Edwin A Young
(74) *Attorney, Agent, or Firm* — Tiajoloff & Kelly LLP

(57) ABSTRACT

A superposition transmission in several variants and embodiments has hydrostatic-mechanical or electric-mechanical power splitting for the use in vehicles and work machines such as municipal vehicles, handling devices such as telehandlers or forklifts, wheel loaders, tractors and comparable apparatuses, in which an infinitely variable adjustment of the gear ratio is desired independent of the speed of the drive engine. The input shaft (1) is connected with a variator which is in operative connection with two summing planetary gears (12) and (13) arranged parallel with respect to each other. The output occurs in all driving speeds and all driving ranges via the planet carrier arranged as carrier (18).

21 Claims, 22 Drawing Sheets

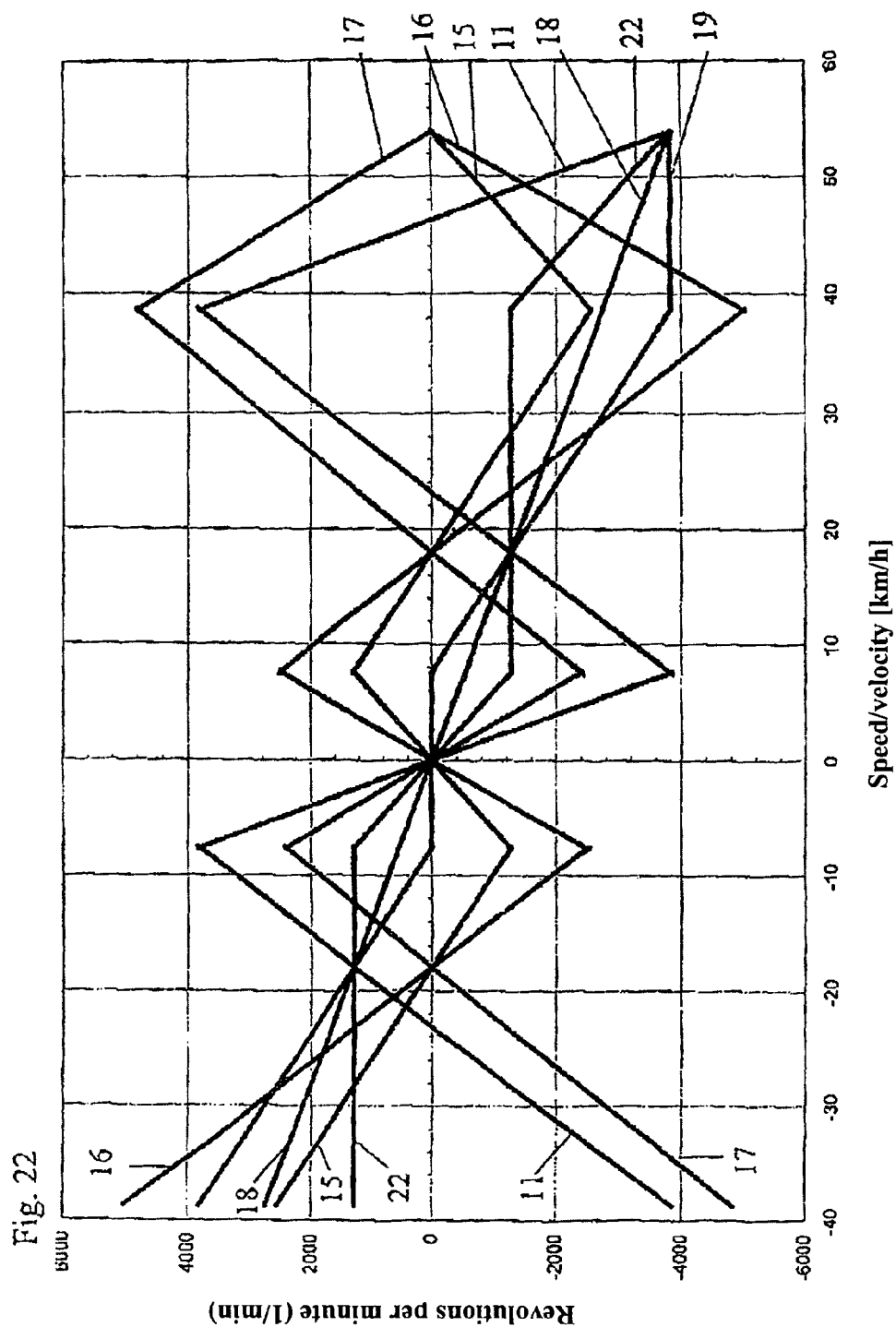

SUPERPOSITION TRANSMISSION

BACKGROUND OF THE INVENTION

The present invention relates to a superposition transmission with hydrostatic-mechanical and electric-mechanical power splitting for the use in vehicles and work machines having wheels, e.g. municipal vehicles, handling devices such as telehandlers or forklifts, wheel loaders, tractors and comparable apparatuses, in which an infinitely variable adjustment of the gear ratio is desired independent of the speed of the drive engine, comprising an internal combustion engine which drives an input shaft of a superposition transmission, with the superposition transmission comprising a control device in form of a variator, with which the direction of rotation of the output shaft can be influenced in an infinitely variable manner.

DESCRIPTION OF THE PRIOR ART

A hydromechanical transmission in the manner of a power split transmission is known from U.S. Pat. No. 3,979,972 which comprises an input shaft and an output shaft connected with an internal combustion engine. Clutches and planetary gears are provided in a first branch between the input shaft and the output shaft, whereas a hydrostatic drive works in a second branch which is in operative connection with spur gears and comprises two hydrostatic units arranged behind one another.

A power-split transmission is known from DE 199 54 894 which is suitable for tractors, wheel- and chain-driven work machines and commercial vehicles. The power-split transmission which is disclosed therein comprises a mechanical branch, a hydrostatic branch and one or several planetary gears, by means of which the mechanical and hydrostatic power components are joined again.

DE 101 28 853 describes a motor vehicle which comprises a drive train with a drive unit, a transmission and a clutch device for torque transfer between drive unit and transmission. The clutch device is arranged as a multiple clutch device, especially a double clutch device, comprising a first clutch arrangement associated with the first transmission input shaft and a second clutch arrangement associated with the second transmission input shaft.

U.S. Pat. No. 3,918,325 shows a power-split transmission, comprising a drive shaft, a first planetary gear for slow running, a second planetary gear for fast running and an output shaft connected with a common planet carrier. Furthermore, a continuously controllable hydraulic transmission branch is provided, comprising hydraulic units working as a pump and motor, of which one acts upon an output shaft.

All these systems as mentioned above have a number of disadvantages. Their gearing arrangement is complex and this leads to considerable production costs. Considerable losses in efficiency are unavoidable in the main operating ranges of the engine and especially at high speeds.

In order to avoid such disadvantages, EP 2034221 describes a driving gear for a motor vehicle, especially a motorcycle, in which a separate reverse gear device can be omitted by the combination of a hydrostatic device and a summing planetary gear. The disadvantageous aspect in this arrangement is that the changeover from a purely hydrostatic drive to the power-split transmission always needs to occur via a slipping clutch.

SUMMARY OF THE INVENTION

The present invention is therefore based on the object of substantially avoiding the mentioned deficiencies of the known devices and enabling a simple arrangement of the transmission which is cost-effective in production. Furthermore, a continuous adjustment of the gear ratio shall be enabled independent of the speed of the drive engine, without leading to any noticeable losses in efficiency.

These objects are achieved in accordance with the invention by a transmission of the kind mentioned above in such a way that the input shaft of the superposition transmission is connected via a spur-gear stage with the input shaft of the variator, comprising an adjusting device having a variator output shaft, the variator output shaft is connected with sun gears of summing planetary gears either via a spur-gear stage or directly, which planetary gears are arranged parallel with respect to one another, the output occurs in all driving speeds and all driving ranges via at least one carrier which is arranged as a planet carrier for all planet gears and is rigidly connected with the output shaft of the superposition transmission.

The transmission in accordance with the invention is based on the principle of power splitting, with all variator systems being suitable in which a change of the output speed of the variator unit is possible in both directions of rotation, which means both hydrostatic variators with variable displacement pumps and fixed-displacement motors or with variable displacement pump and variable displacement motor, with the variable displacement motor being arranged in the form of axial piston machines or vane units, and also as electric variators as a combination of a generator with an electric motor, possibly also by including electric storage systems.

Merely hydrostatic variator units are shown and described below and especially in the drawings for reasons of simplicity. The invention applies expressly also to analogous embodiments with suitable alternative variators.

BRIEF DESCRIPTION OF THE DRAWINGS

The invention is explained below in closer detail by reference to the drawings, wherein:

FIG. 22 shows a diagram with the gear ratios in a transmission according to FIG. 20.

Figure 1:
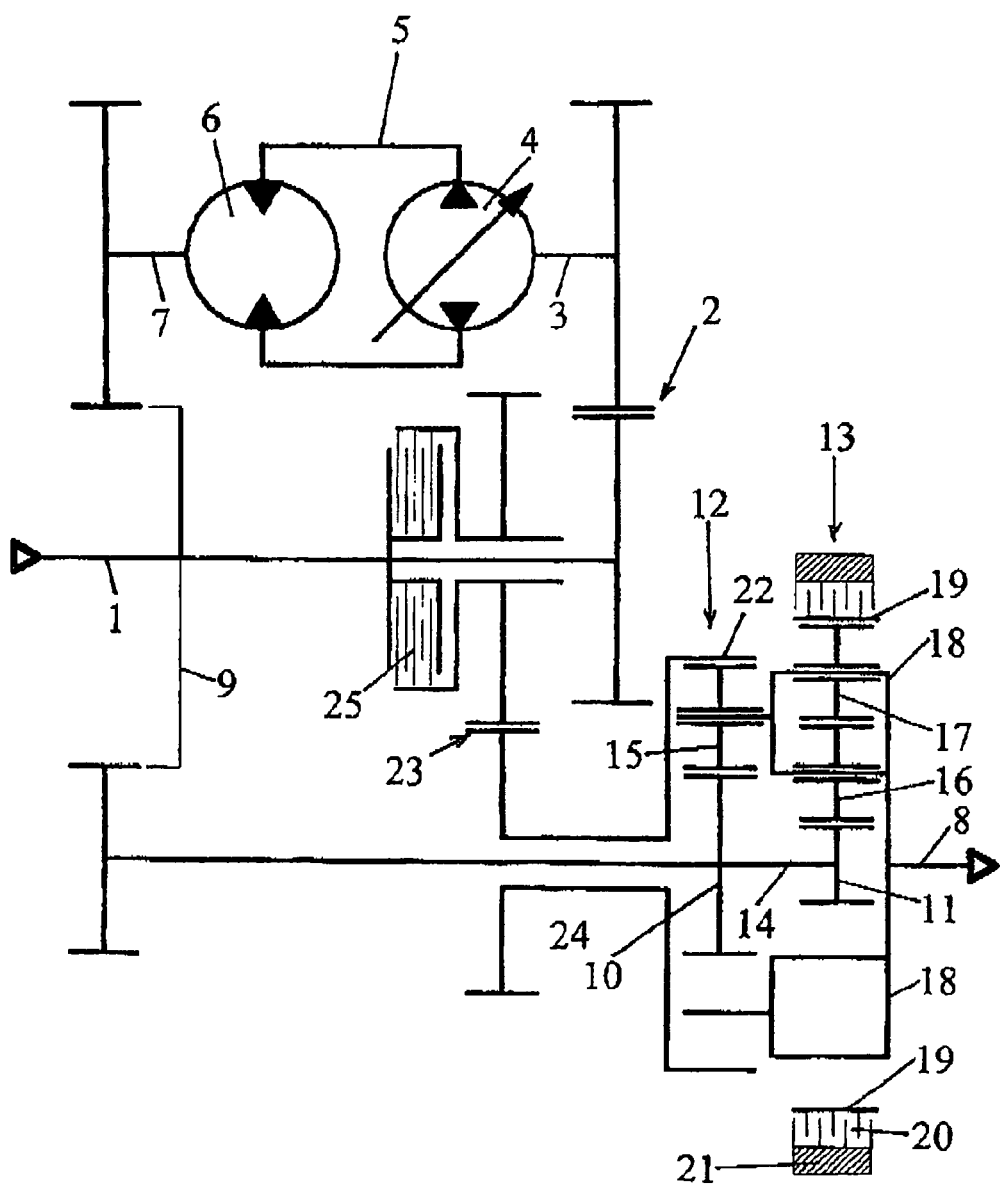
FIG. 1 shows a transmission with a two-row summing planetary gear set, a hydraulic unit and a clutch for shifting in synchronous operation from purely hydrostatic drive to a power-split output for forward drive.

In accordance with FIG. 1, a transmission input shaft 1 drives a variable-displacement pump 4 of a variator system 5 via a spur-gear stage 2 and via the shaft 3. A hydraulic motor 6 is driven as a result of the oil flow conveyed by the variable-displacement pump 4. The variator system 5 consisting of the variable-displacement pump 4 and the hydraulic motor 6 is used for continuous control and also allows reverse drive at low speeds without requiring a mechanical reverse gear for this purpose. The variator system 5, as a control device, changes the direction of rotation of the variator output shaft 7 for forward and reverse drive when the vehicle starts to move on the one hand, and the variator system 5 allows adjusting the output shaft 8 in a continuous manner up to a first top speed during the vehicle start process. The variator output shaft 7 is coupled either directly or via a spur-gear stage 9 with the sun gears 10 and 11 of two summing planetary gears 12 and 13 which are arranged parallel in respect to one another. The two sun gears 10 and 11 are connected with one another in a torque-proof manner via shaft 14. The planetary gears 15 of the summing planetary gear 12 and the planetary gears 16 and 17 of the summing planetary gear 13 are rotatably held in a common carrier arranged as a planet carrier 18.

In the embodiments of the transmissions as shown in FIGS. 1 to 7 and 10, the sun gear 10 meshes with the planetary gears 15 in the summing planetary gear 12, which planetary gears 15 are in meshing engagement with the ring gear 22. The ring gear 22 is connected with the spur-gear stage 23 via the hollow shaft 24, leading to clutch 25. In the summing planetary gear set 13, the sun gear 11 meshes with the planetary gears 16 with a relatively small diameter, which on their part comb with planetary gears 17, with the planetary gears 17 being in meshing engagement with the ring gear 19.

In the embodiments of the transmission as shown in FIGS. 11 to 20 and 21, the sun gear 10 meshes with the planetary gears 16 in the summing planetary gear 12, which on their part mesh with the planetary gears 17, which on their part are in meshing engagement with the ring gear 22. The ring gear 22 is in connection with the spur-gear stage 23 via the hollow shaft 24, leading to the clutch 25. In the summing planetary gear set 13, the sun gear 11 meshes with the planetary gears 15 which are in meshing engagement with the ring gear 19.

Figure 2:
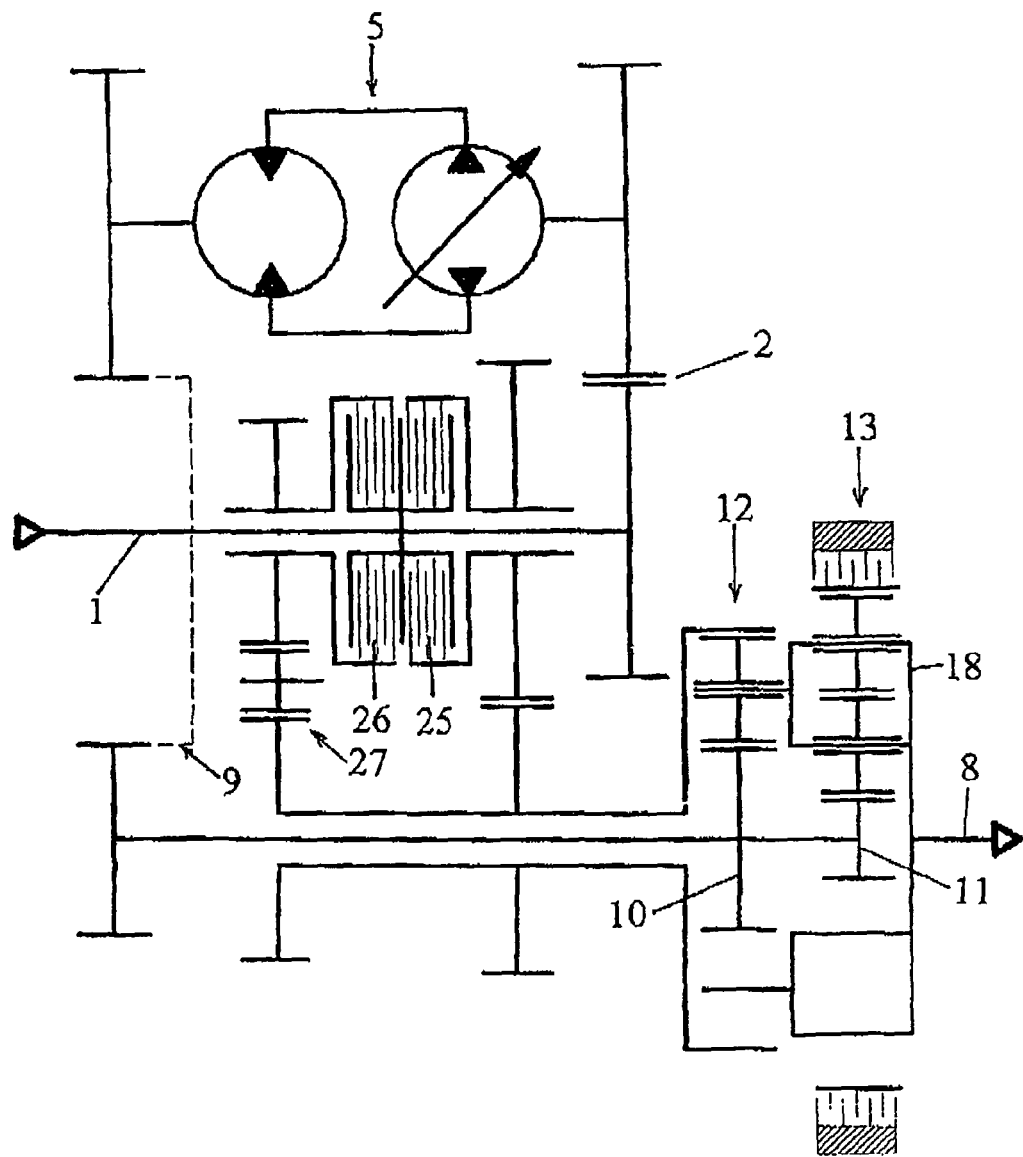
FIG. 2 shows a transmission according to FIG. 1 with a forward gear and a reverse gear.
Figure 3:
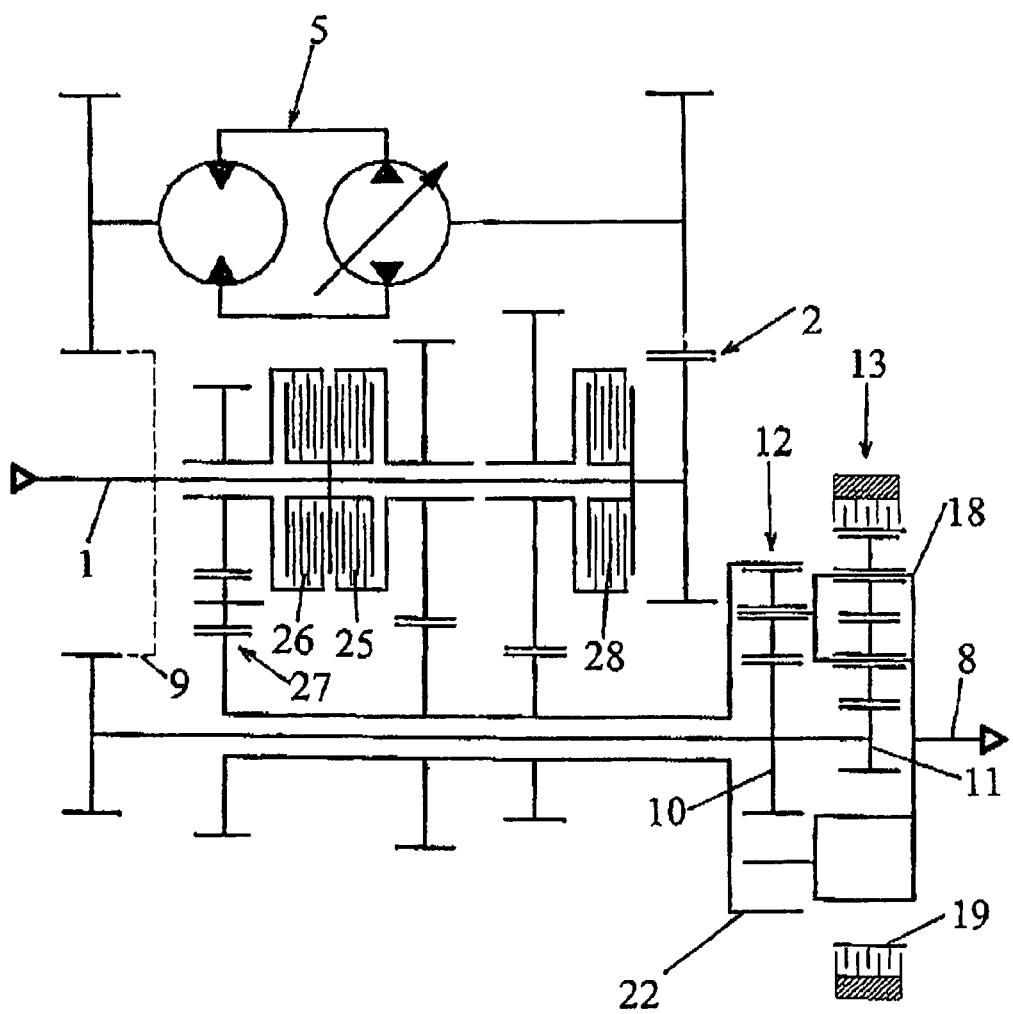
FIG. 3 shows a transmission according to FIG. 2 with two forward gears, with the second forward gear being changed via a slipping clutch.
Figure 4:
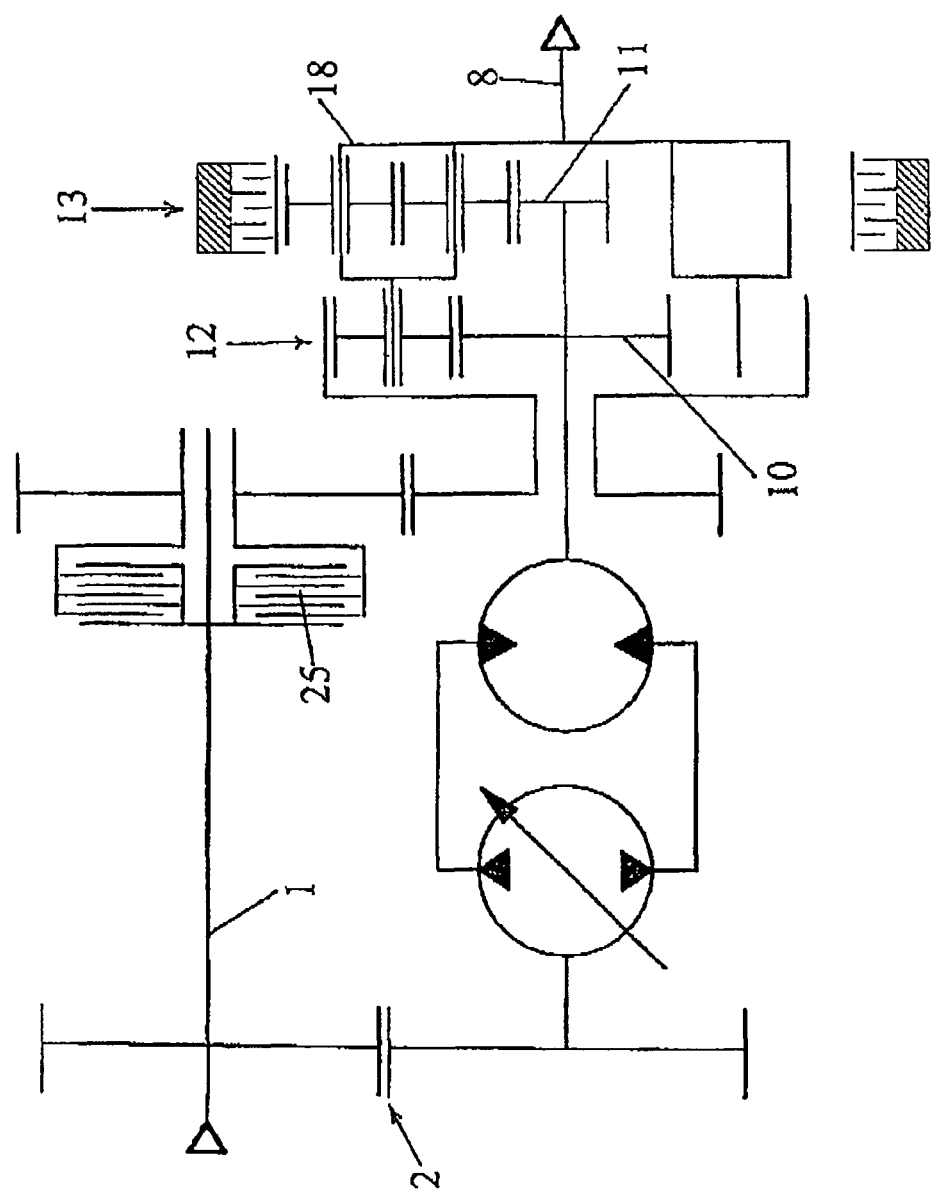
FIG. 4 shows a transmission according to FIG. 1 in stretched configuration.
Figure 5:
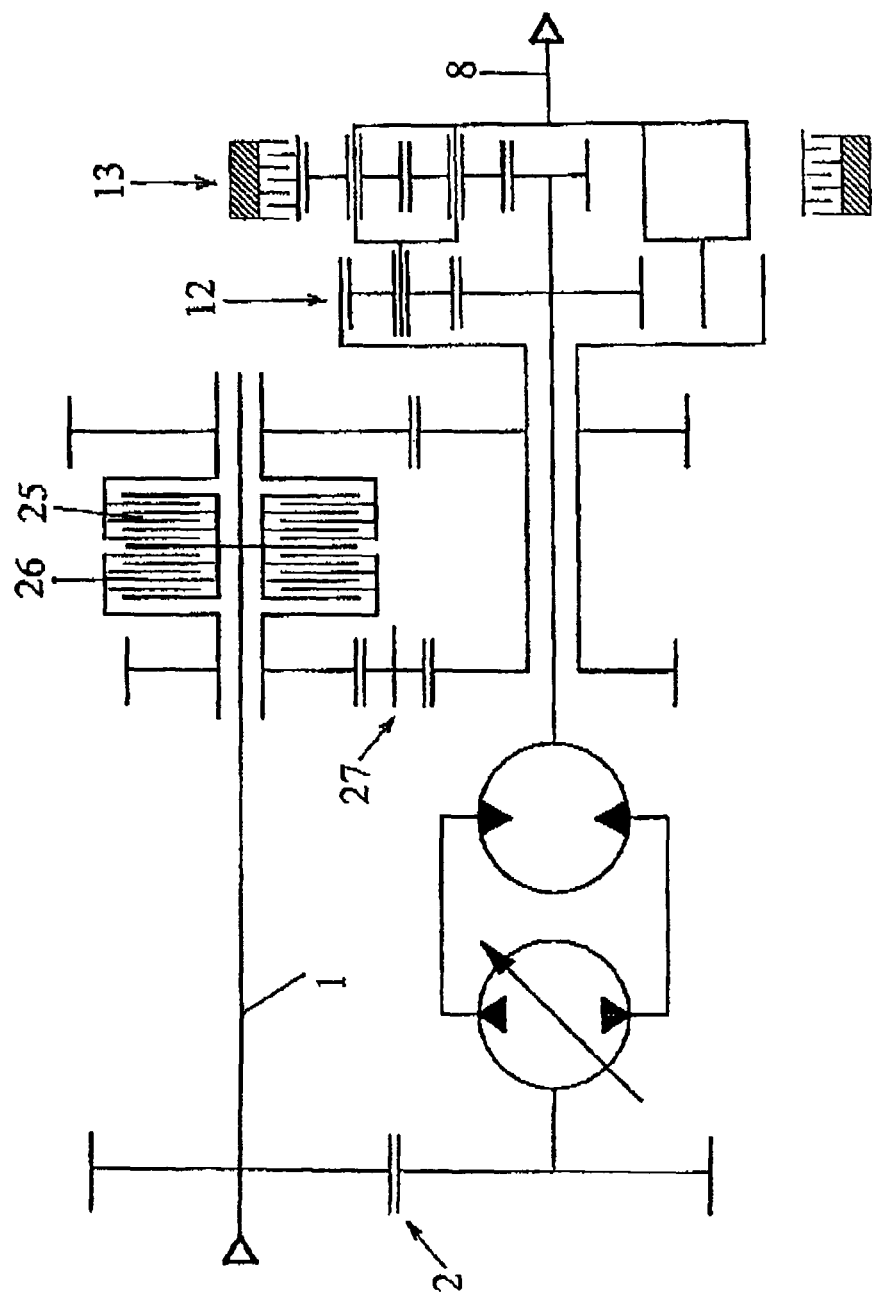
FIG. 5 shows a transmission according to FIG. 2 in stretched configuration.

When the vehicle starts to move, the ring gear 19 of the summing planetary gear 13 is connected in a torque-proof manner with the housing 21 via the clutch or brake 20. A high tractive force is thus achieved as a result of the chosen gear ratios. The output occurs by the variator output shaft 7 either via the spur-gear stage 9, as shown in FIGS. 1, 2 and 3, or directly, as shown in FIGS. 4 and 5, onto the sun gear 11 which transfers the drive torque onto the carrier 18 and thus the output shaft 8. Clutch 20 is closed in this process, the ring gear 19 does not rotate.

The speed of the output shaft 8 is coupled via the gear ratio in planetary gear set 13 with the speed of the variator output shaft 7 and can be varied in a continuous manner in both directions of drive within the scope of the speed limits of the variator.

With increasing adjustment of the variable displacement pump 4, the speed of sun gear 10 and thus the ring gear 22 increases during the forward drive until the synchronization point in clutch 25 has been reached. In this operating state, the variator is close to the maximum speed in one direction.

Figure 12:
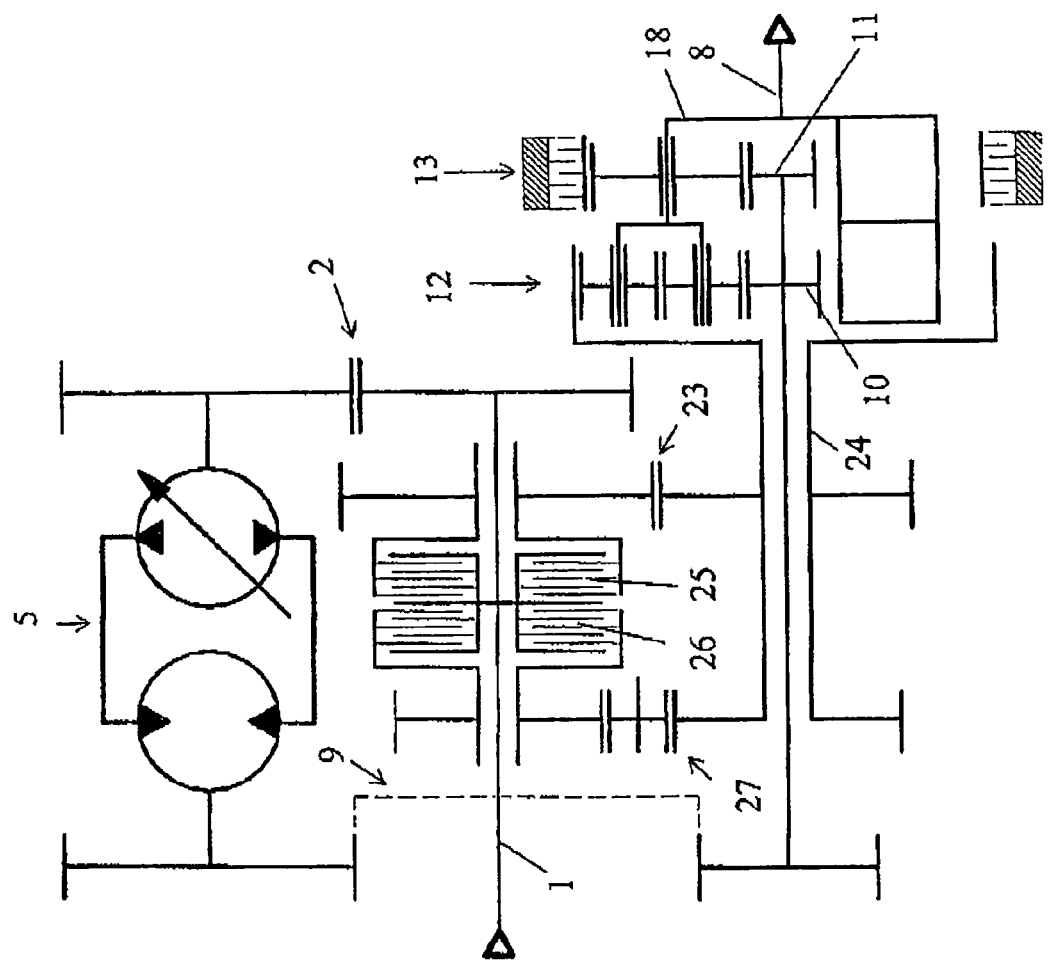
FIG. 12 shows a transmission according to FIG. 11 with a forward and reverse gear.

In the same way, the speed of sun gear 10 and thus the ring gear 22 increases in FIGS. 2 and 12 with increasing adjustment of the variable displacement pump 4 during the reverse drive until the synchronization point in clutch 26 has been reached. The reversal in the direction of rotation is made via the spur-gear stage 27. In this operating state, the variator is also close to the maximum speed in one direction.

As is shown in FIGS. 1 to 7 and 10, the use of the reversing planetary gears 16 and 17 ensure that the direction of rotation of the ring gear 22 is directed against the direction of rotation of the sun gears 10 and 11 when the ring gear 19 is fixed. In the embodiments as shown in FIGS. 11 to 20 and 21, the direction of rotation of the ring gear 22 is in the same direction as the direction of rotation of the sun gears 10 and 11 when the ring gear 19 is fixed. In all cases, synchronous speed is achieved in clutch 25 with a sufficiently high speed at the sun gears 10 and 11.

When the synchronous speed is reached in clutch 25, it is closed in a manner overlapping the clutch 20, and clutch 20 is opened thereafter, whereupon the ring gear 19 begins to rotate. In this operating state, the variator is close to the maximum speed in one direction. The ring gear 22 is now coupled with the transmission input shaft 1 via the spur-gear stage 23 and the clutch 25 and is thus mechanically driven. After the closing of the clutch 25, the speed on the variator output shaft 7 is reduced again and accelerated in the opposite direction for further increasing the speed of the output shaft 8. Upon reaching the maximum speed of sun gear 10, the maximum output speed is reached in this power-split area. The output occurs always via the carrier 18 to the output shaft 8.

The functionality of this of gear directly adjacent to the pure variator drive can be used in an advantageous manner both in the transmission arrangements with a forward gear, as shown in FIGS. 1 and 11 and FIGS. 4 and 14, as also in transmission with a forward gear and reverse gear, as shown in FIGS. 2 and 12 and FIGS. 5 and 15. The question whether in the concrete application a short configuration is used, as is shown in FIGS. 1, 2, 3, 11, 12 and 13, or a long configuration, as shown in FIGS. 4, 5, 14 and 15, depends merely on how much overall space is available for the concrete application.

Many variations are possible in this case due to the very simple and compact construction of the transmission in accordance with the invention.

Figure 6:
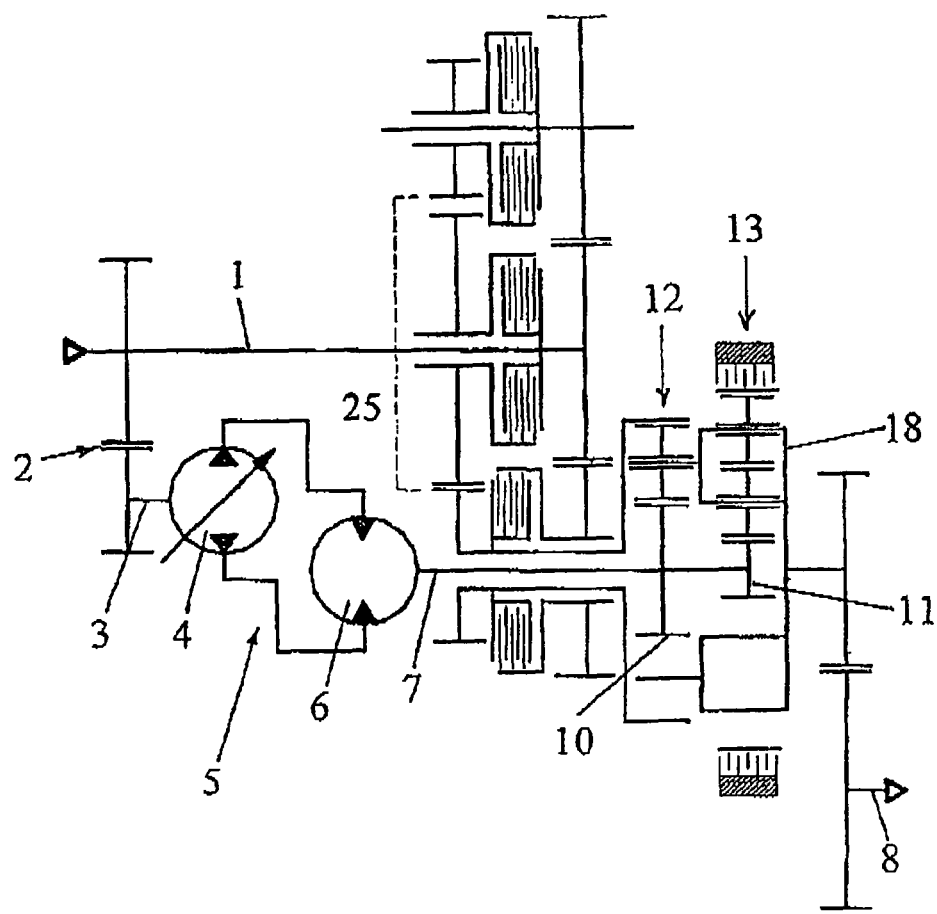
FIG. 6 shows a transmission with a variator in compact configuration with a parallel disposed hydraulic pump and hydraulic motor in the shape of a Z.
Figure 7:
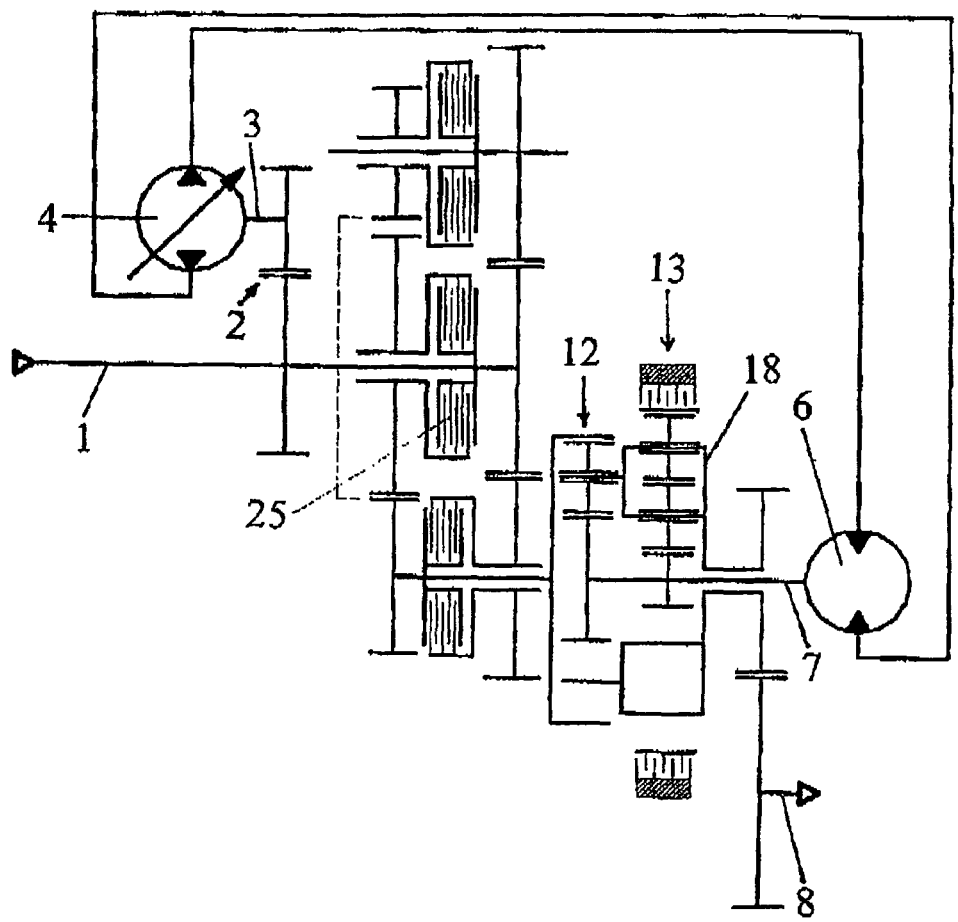
FIG. 7 shows a transmission according to FIG. 3 with a variator of separate units.
Figure 16:
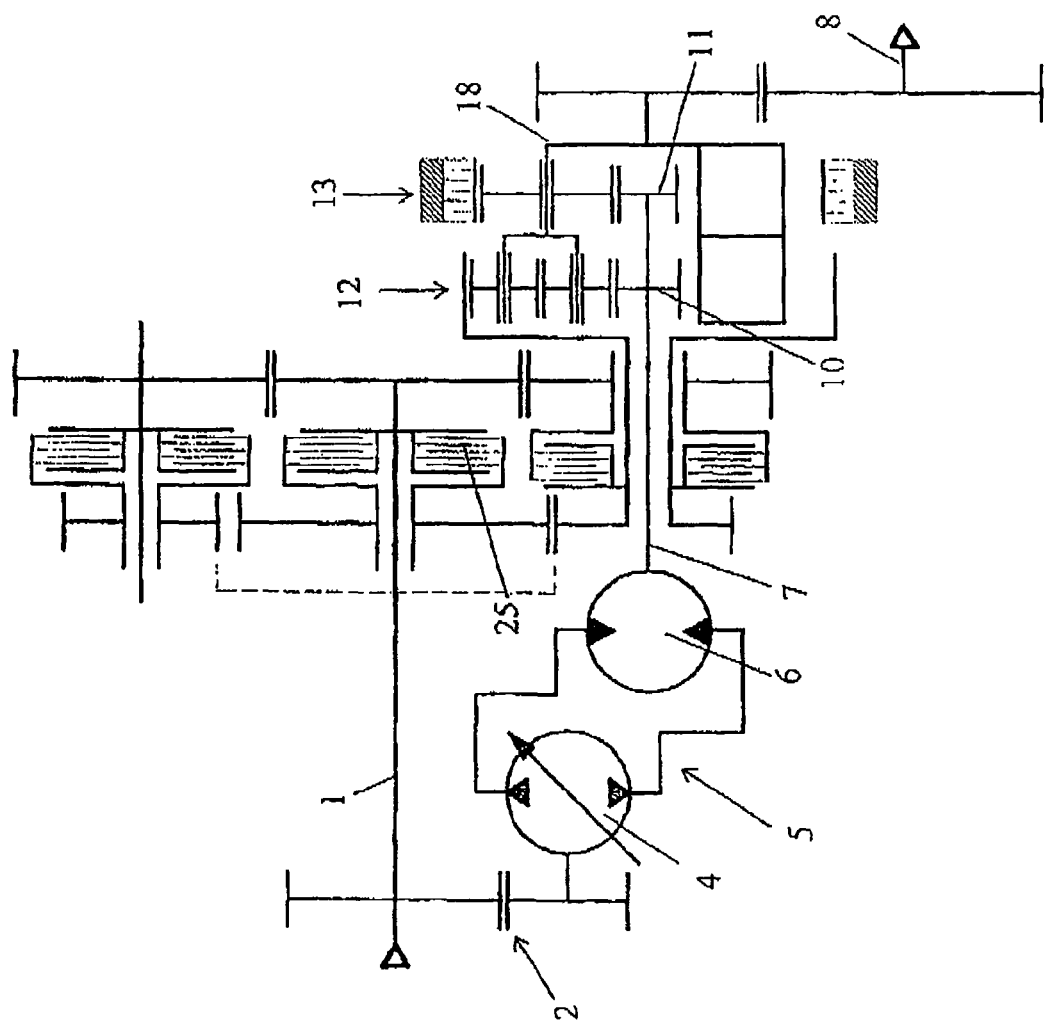
FIG. 16 shows a transmission according to FIG. 13 with a variator in compact configuration with a parallel disposed hydraulic pump and hydraulic motor shaped in the form of a Z.
Figure 17:
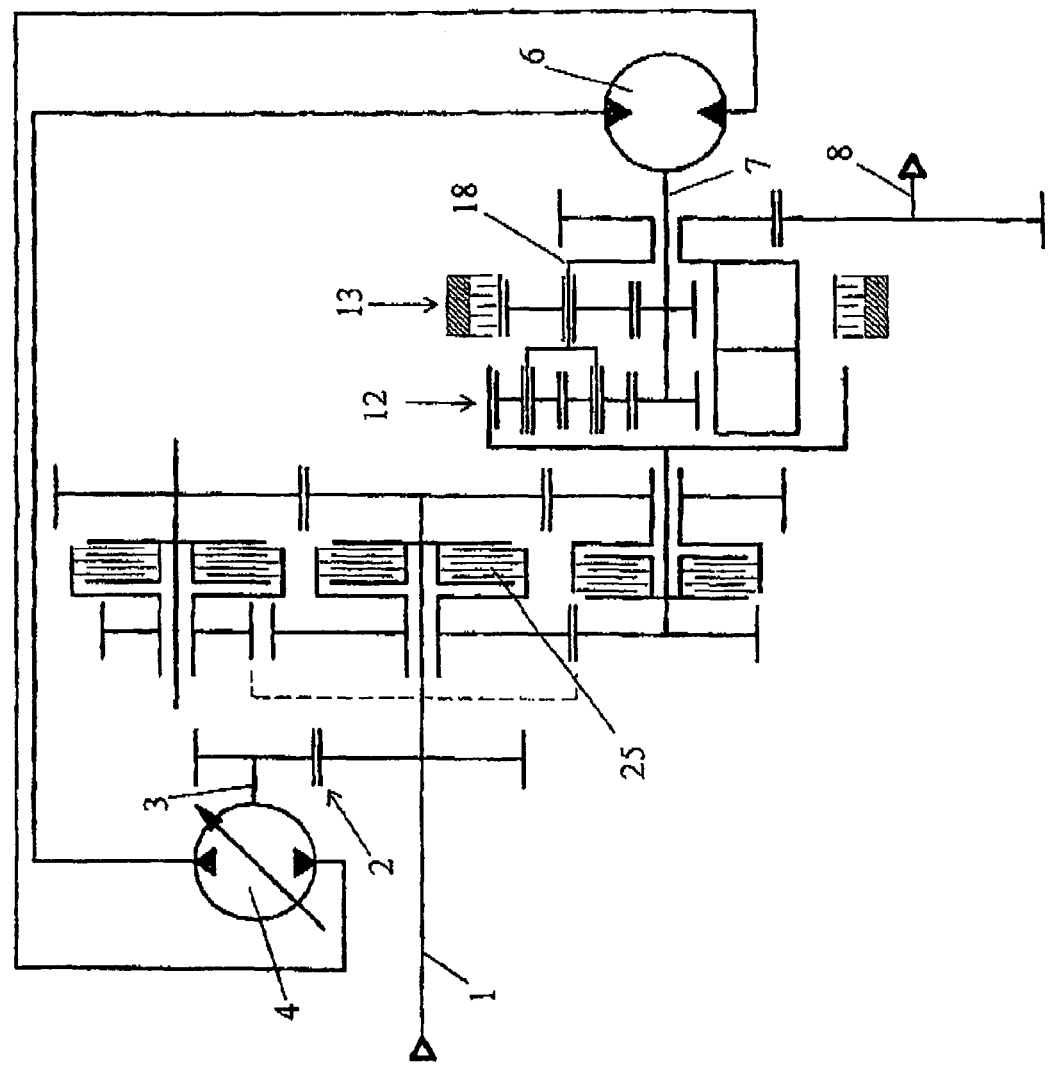
FIG. 17 shows a transmission according to FIG. 13 with a variator made of separate units.

For applications in which the available overall space should still represent a problem, it is also possible to arrange the variator as a compact module 5 with parallel arranged variable displacement pump 4 and hydraulic motor 6 in U- or Z-arrangement according to FIGS. 6 and 16, or as separate units in resolved construction according to the FIGS. 7 and 17. These variants also represent short configurations. It is also possible however to arrange these two variants in long configuration, depending on how the available overall space can be utilized optimally. For the sake of simplicity, these additional variants will not be explained separately.

Figure 13:
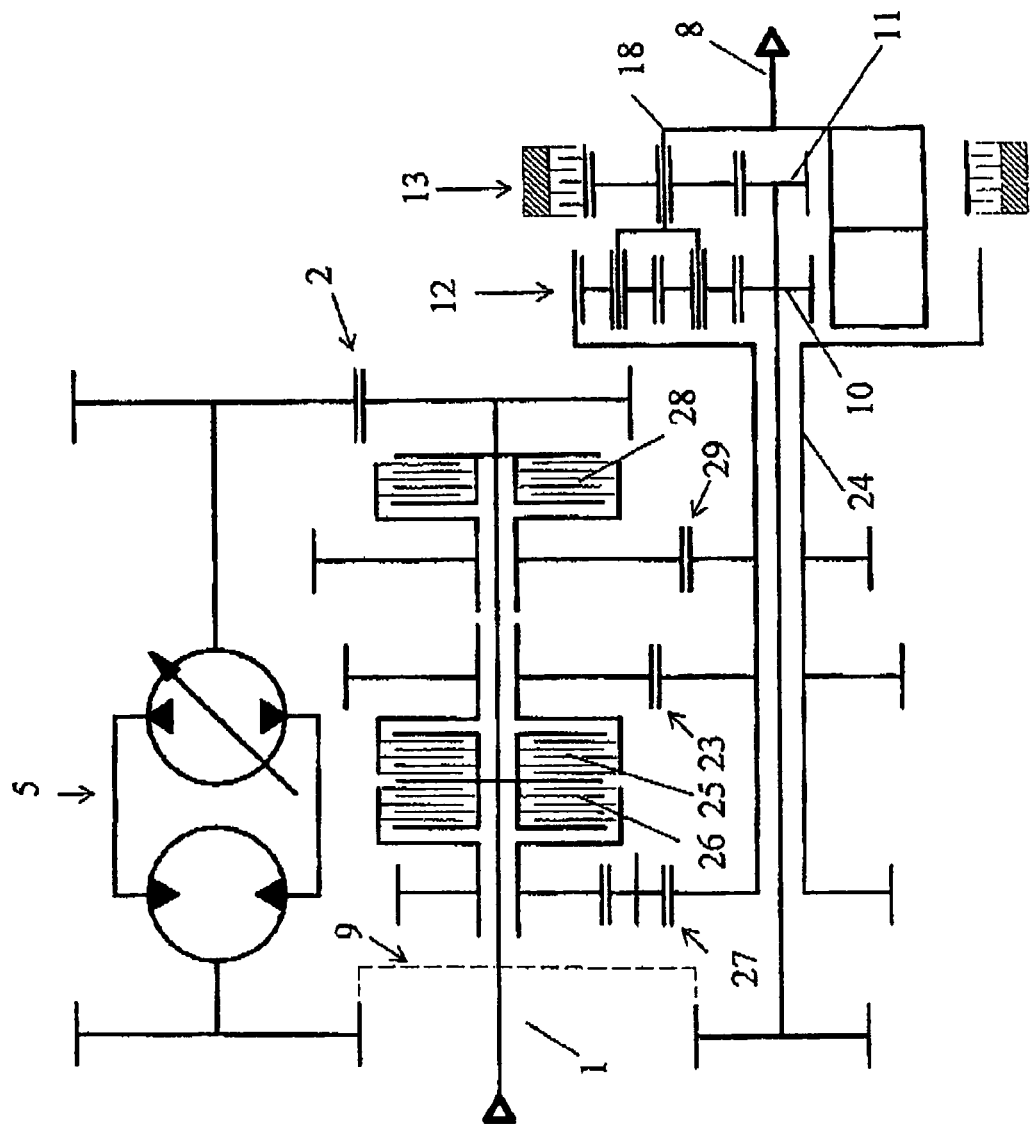
FIG. 13 shows a transmission according to FIG. 11 with two forward and one reverse gear, with the second forward gear being shifted via a slipping clutch.

In the case of an extension of the gear spread, additional speed steps can be provided between the transmission input shaft 1 and the ring gear 22, as indicated in FIGS. 3 and 13. They show a variant with one reverse gear and two forward gears. As a result of the additional speed step, the gear spread can be increased. The shifting from the first forward gear to the second forward gear occurs in this case via a slipping clutch because in the illustrated arrangement of the transmission it is not possible to achieve synchronous speed at the changeover point in the clutches 25 and 28.

Figure 10:
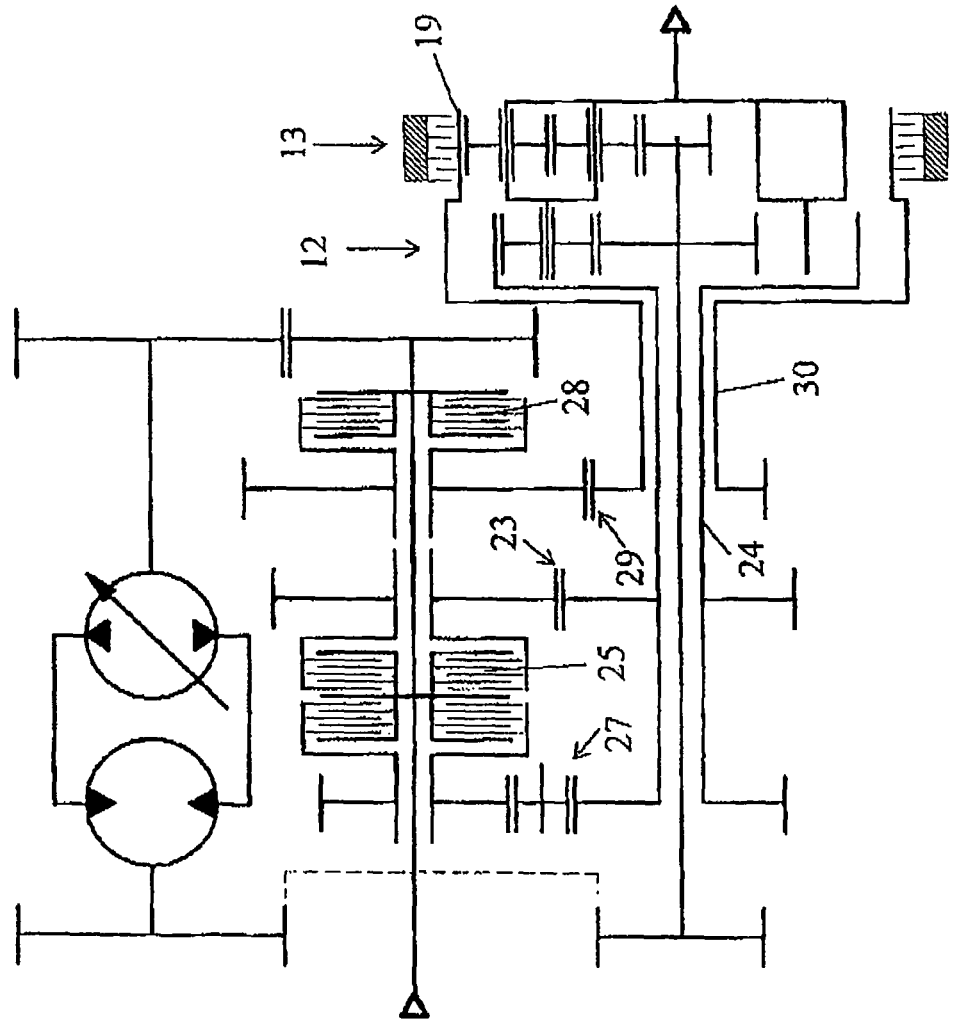
FIG. 10 shows a transmission according to FIG. 3, with a first ring gear being connected with the transmission input shaft via two spur-gear stages and two clutches, and a second ring gear via a spur-gear stage and a clutch, and the shifting of one gear to the adjacent gear occurring at synchronous speed.
Figure 20:
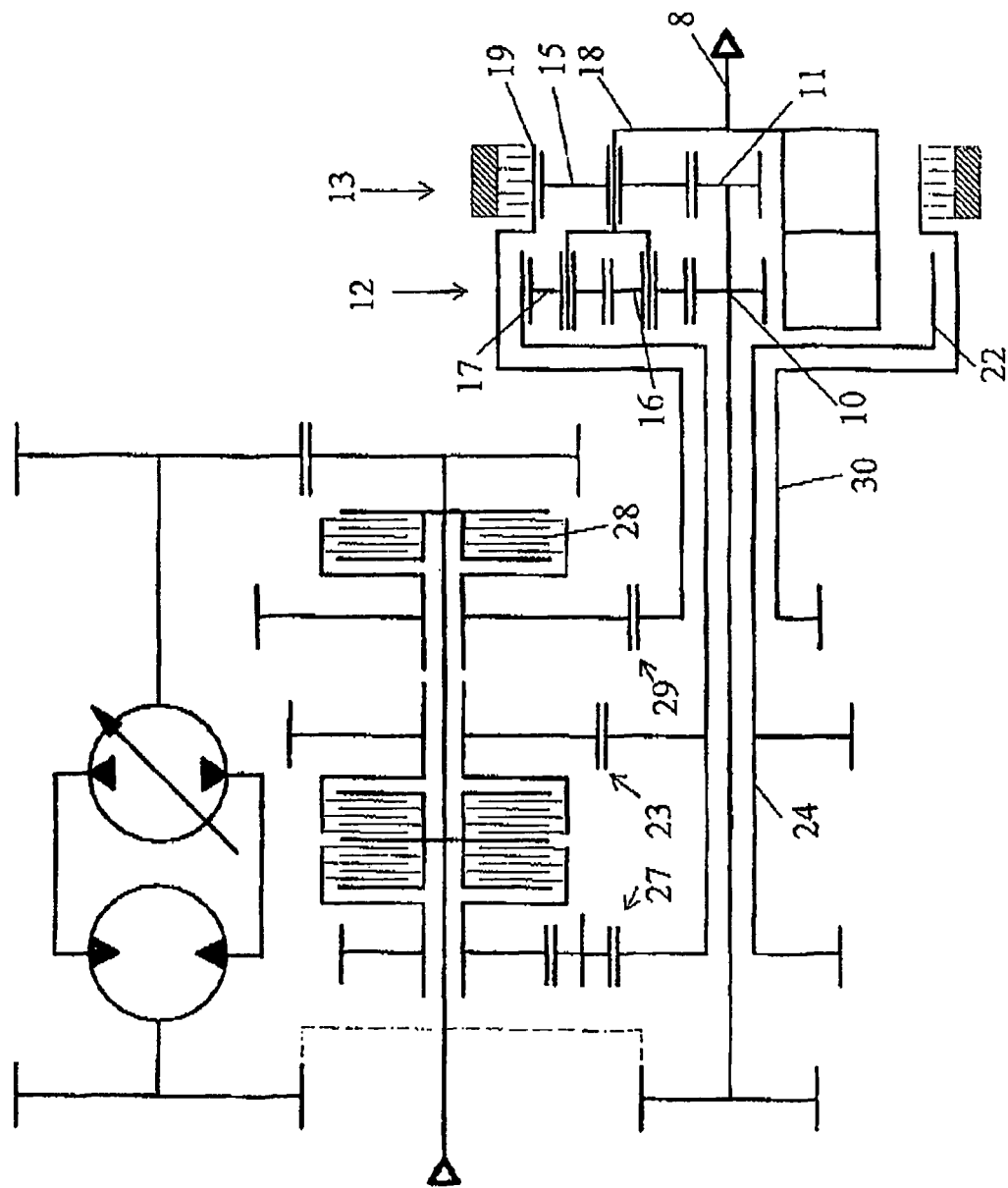
FIG. 20 shows a transmission according to FIG. 13, in which a first ring gear is connected with the transmission input shaft via two spur-gear stages and two clutches, and a second ring gear via a spur-gear stage and a clutch, and the changing from one gear to an adjacent gear occurring at synchronous speed.
Figure 21:
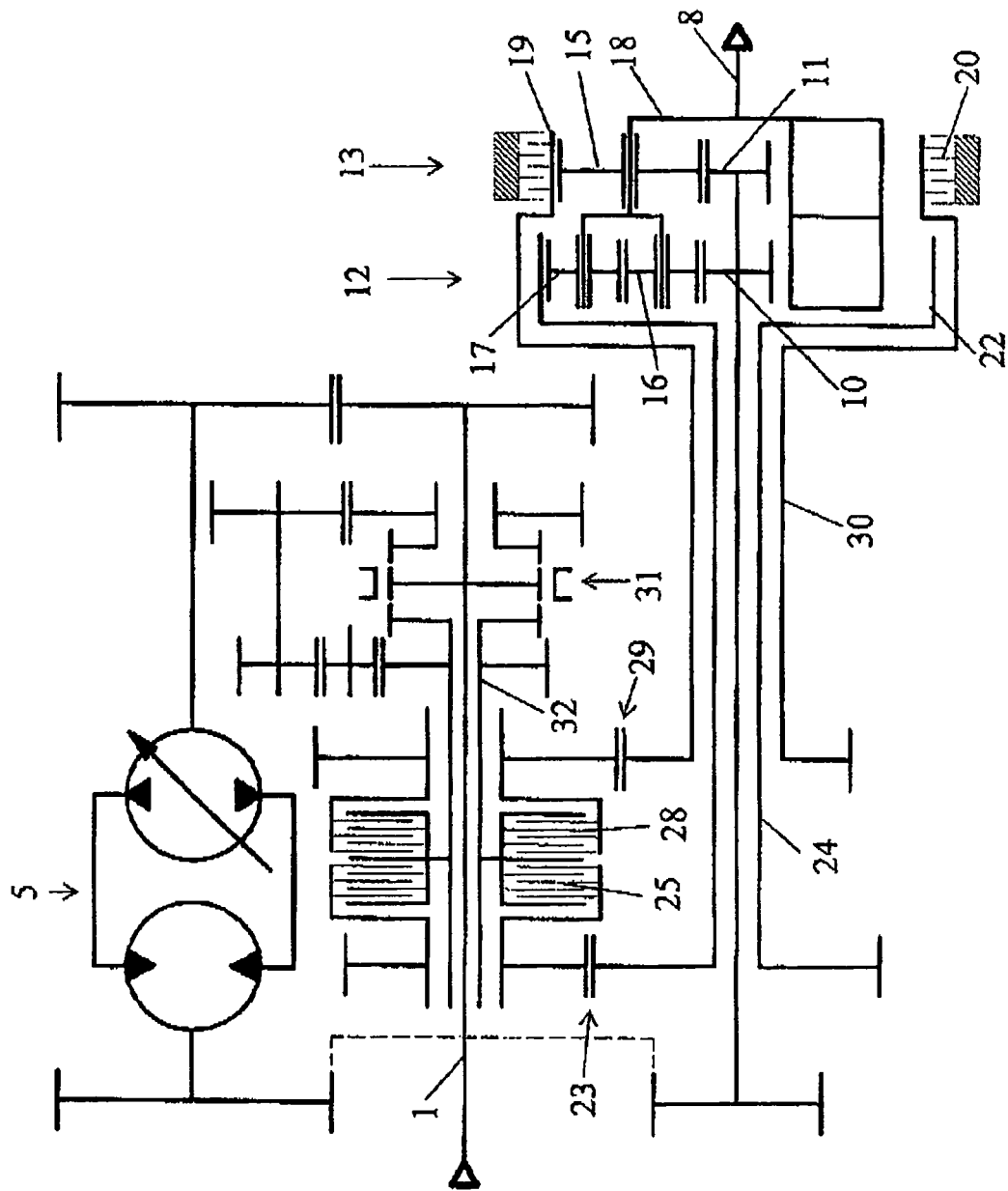
FIG. 21 shows a transmission according to FIG. 20, in which two power-split areas are each provided for forward drive and reverse drive and all changes are made at synchronous speed.

FIGS. 10, 20 and 21 show arrangements of transmissions as an alternative to the arrangements of transmissions as shown in FIGS. 3 and 13, in which a changeover from a first power-split area to the second power-split area occurs at synchronous speed. As a result of the chosen gear ratios and the coupling of the ring gear 19 via the hollow shaft 30 and the spur-gear stage 29, synchronous speed is achieved in clutch 28 at a sufficiently high speed on the planet carrier 18 or the sun gears 10 and 11. The changeover from the first to the second power-split area and the return changeover from the second to the first power-split area can occur by overlapping closing of the clutches 25 and 28 at synchronous speed.

A change of pure variator output to mechanical output at the synchronization point with the ring gear 22 is provided during reverse drive via clutch 26 in the arrangement of transmissions according to FIGS. 2, 3, 5, 12, 13 and 15.

Figure 8:
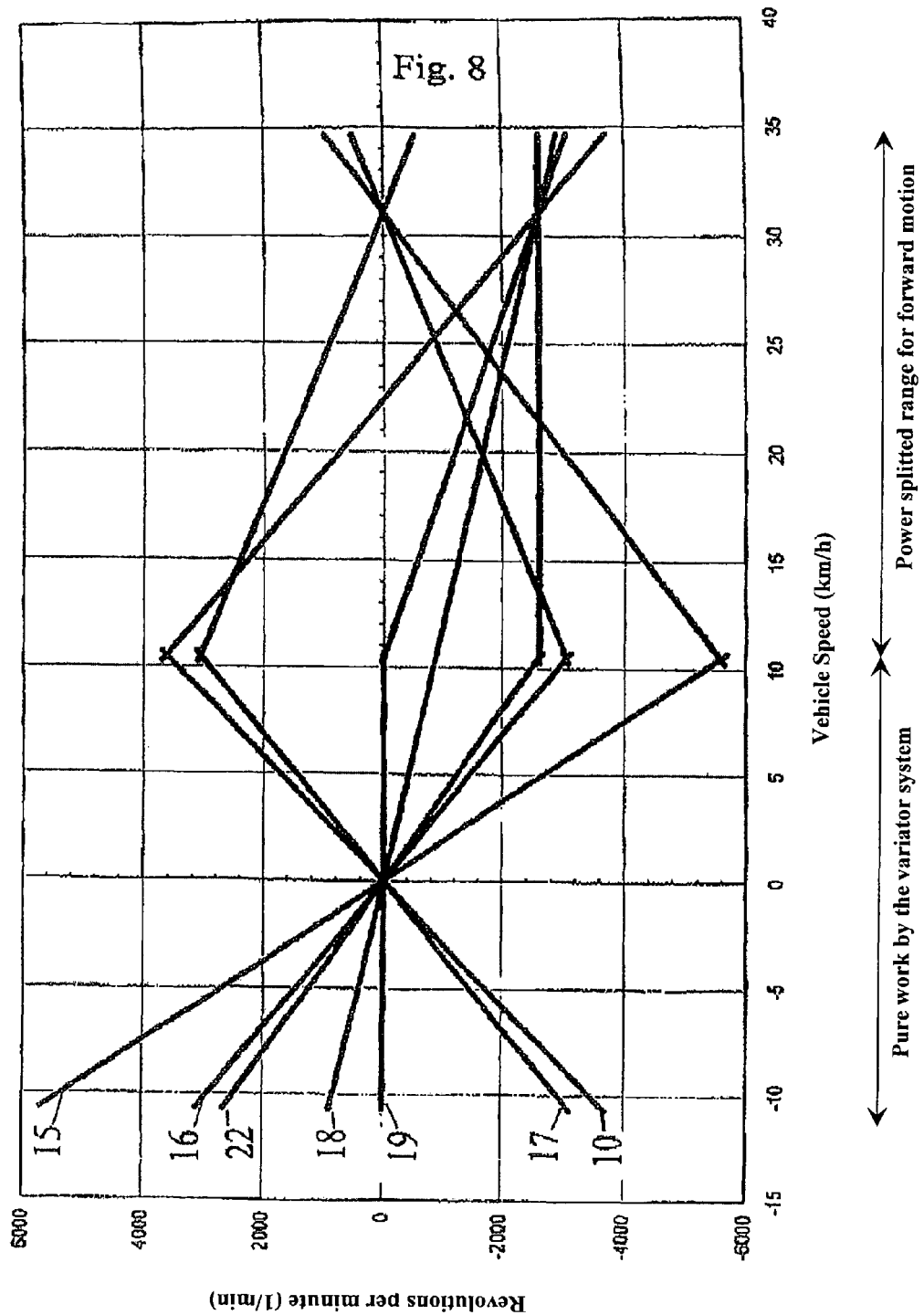
FIG. 8 shows a diagram with the gear ratios in a transmission according to FIG. 1 or 4.

FIG. 8 shows a speed diagram of the individual components of the transmission depending on the vehicle speed according to the transmission diagrams of FIGS. 1 and 4. The reference numerals of FIG. 8 correspond to the reference numerals of FIGS. 1 and 4.

Figure 11:
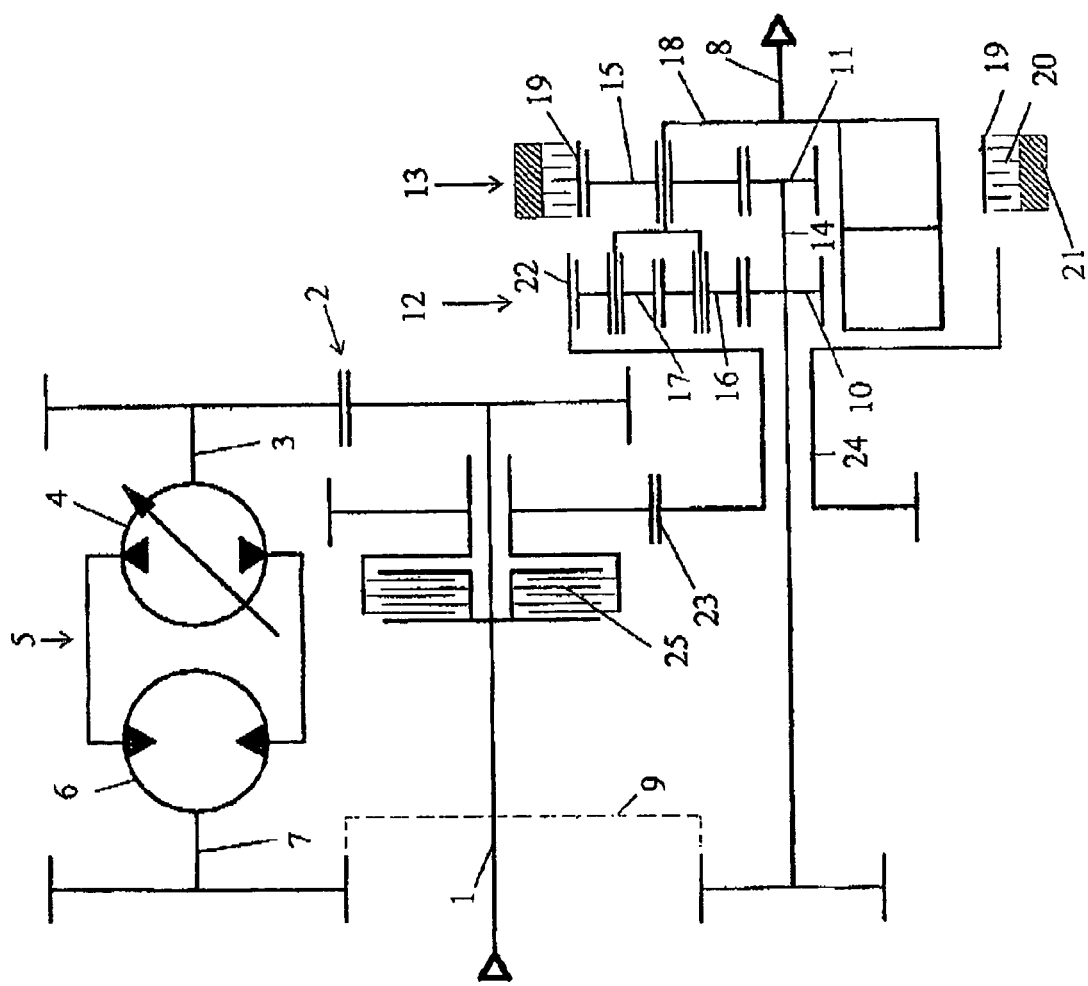
FIG. 11 shows a transmission according to FIG. 1, with the position of the reversing planetary gear set and the direct planetary gear set being exchanged, through which the hydrostatic drive is illustrated by the direct planetary gear set and the power-split drive via the reversing planetary gear set.
Figure 14:
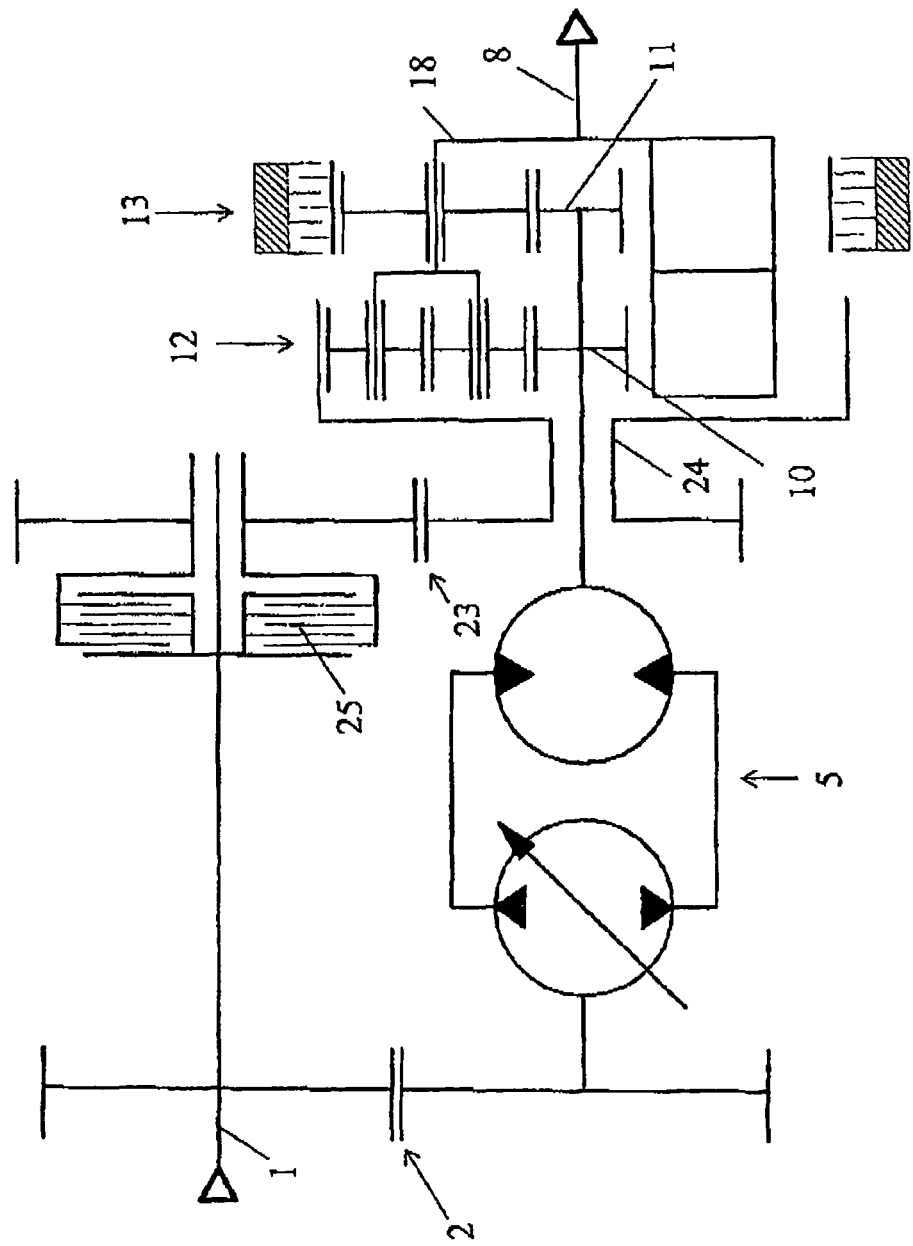
FIG. 14 shows a transmission according to FIG. 11 in a stretched configuration.
Figure 15:
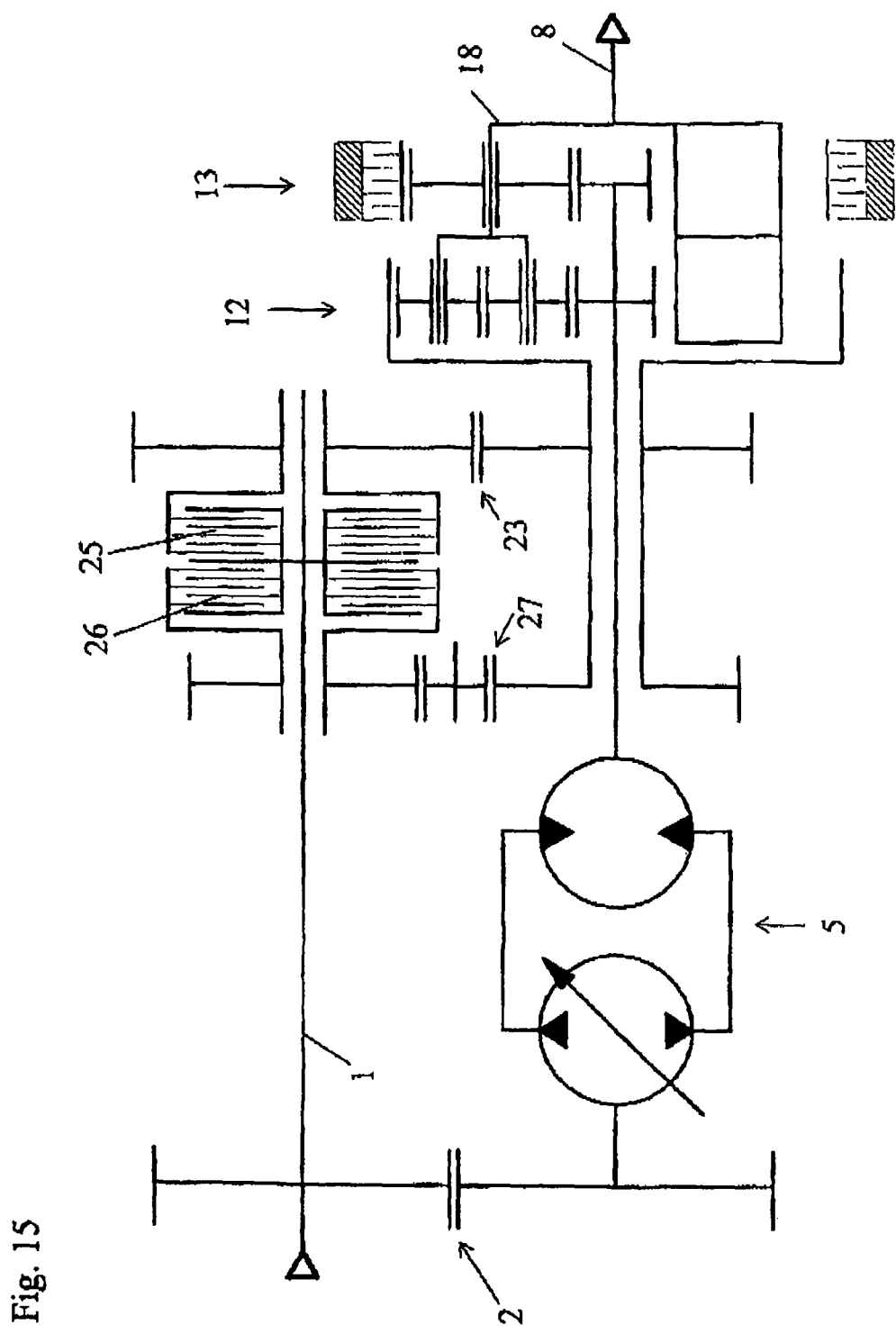
FIG. 15 shows a transmission according to FIG. 12 in a stretched configuration.
Figure 18:
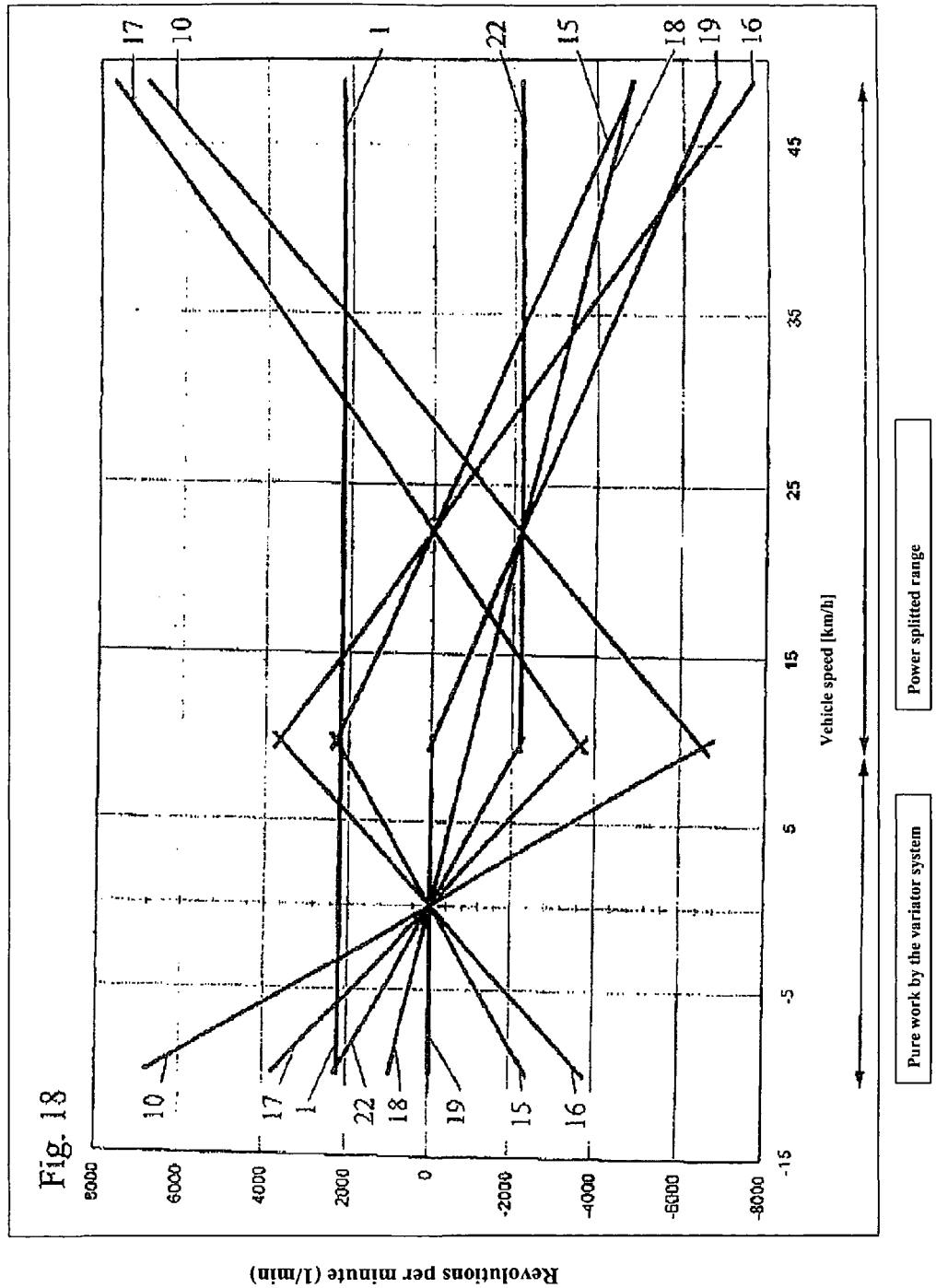
FIG. 18 shows a diagram with the gear ratios in a transmission according to FIGS. 11 and 14.

FIG. 18 shows a speed diagram of the individual components of the transmission depending on the vehicle speed according to the transmission diagrams of FIGS. 11 and 14. The reference numerals of FIG. 18 correspond to the reference numerals of the FIGS. 11 and 14.

Figure 9:
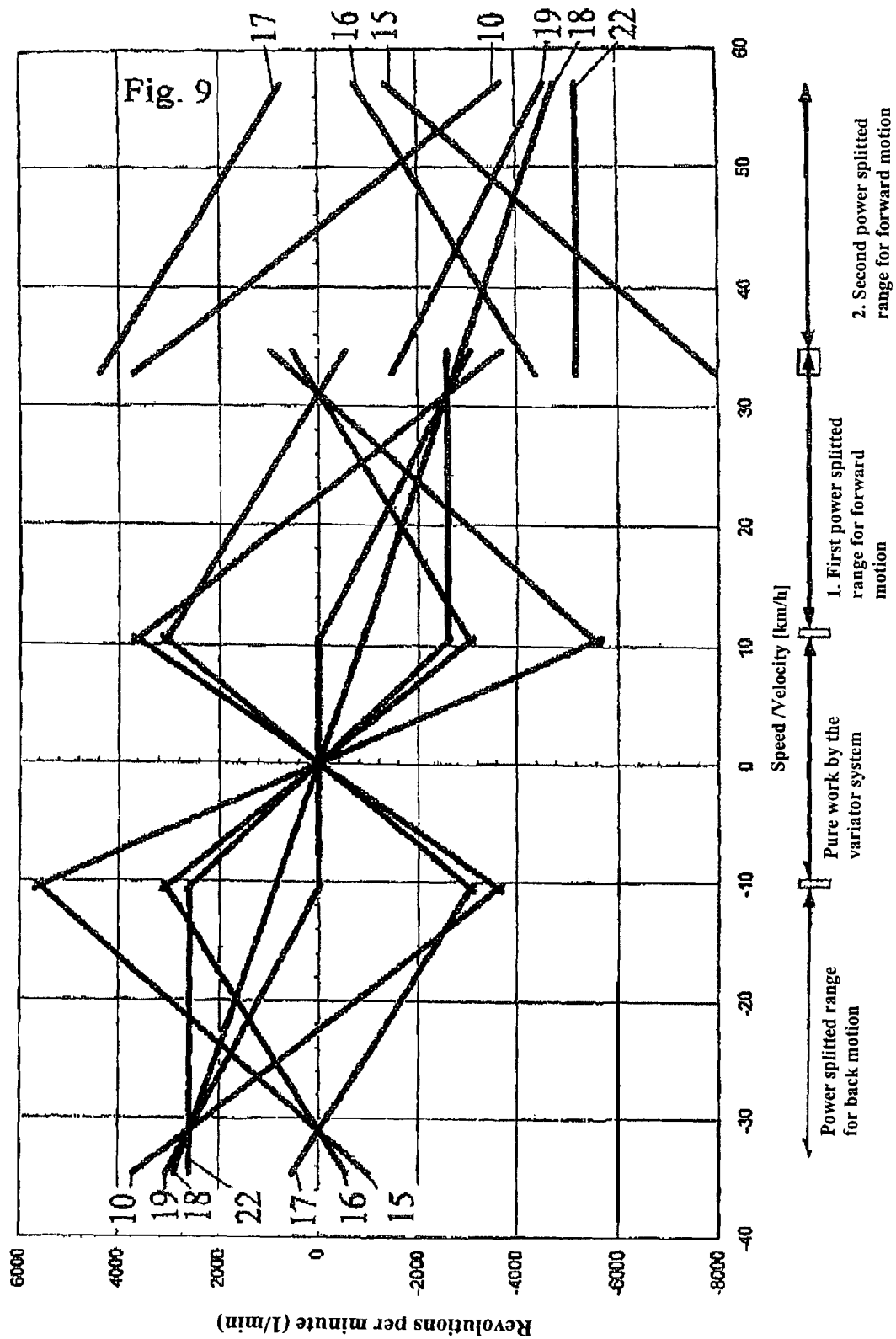
FIG. 9 shows a diagram with the gear ratios in a transmission according to FIG. 3.
Figure 19:
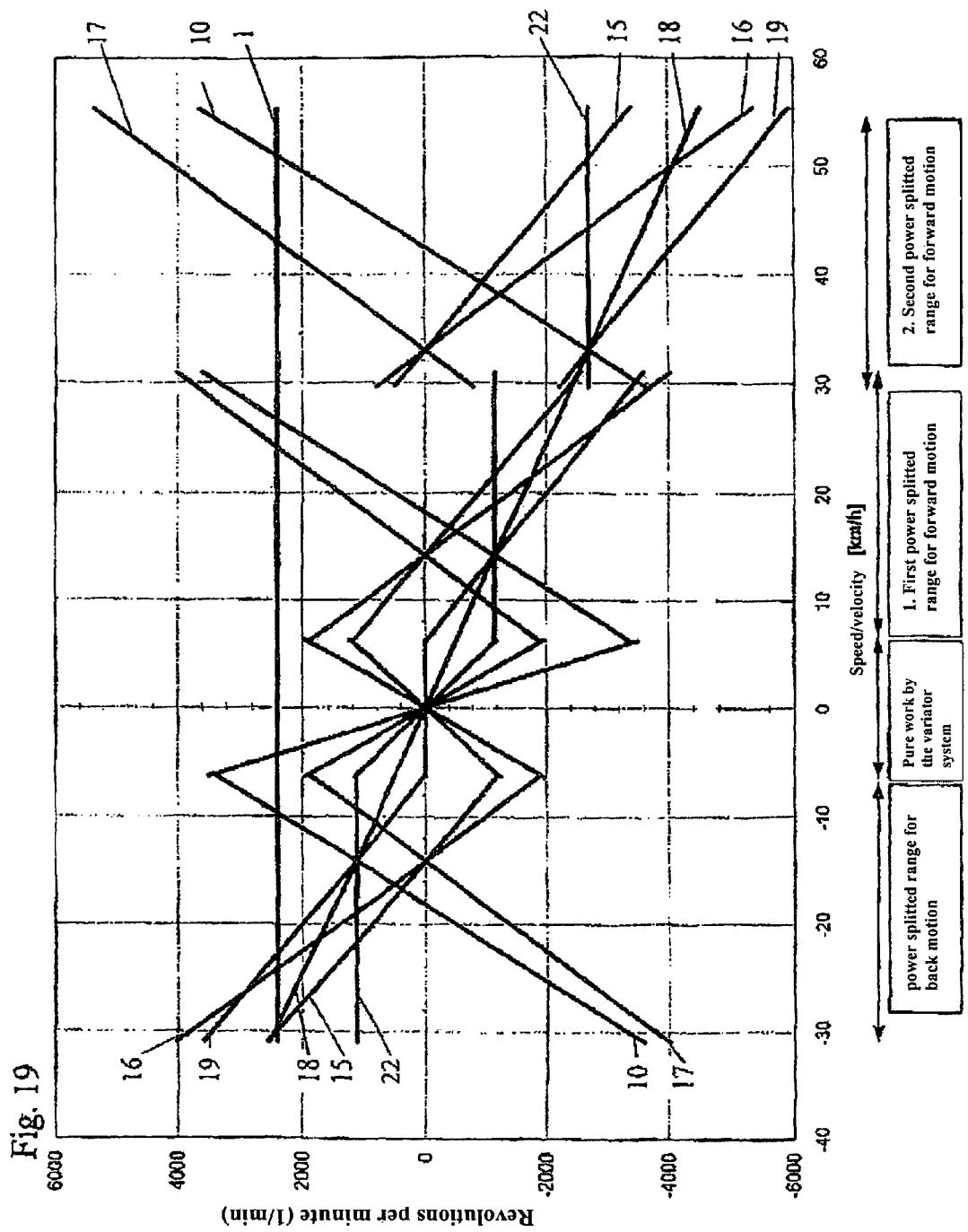
FIG. 19 shows a diagram with the gear ratios in a transmission according to FIG. 13.

FIGS. 9 and 19 show the speed diagrams of the individual components of the transmissions depending on the vehicle speed according to the transmission diagrams of the FIGS. 3 and 13. The reference numerals of FIG. 9 correspond to the reference numerals of FIG. 3, and the reference numerals of FIG. 19 correspond to the reference numerals of FIG. 13.

The diagrams show that the change in drive of ring gear 22 from variator drive to mechanical drive occurs via clutch 25 and the spur-gear stage 23 or via clutch 26 and the reversing spur-gear stage 27 at synchronous speed in each case. The changeovers in the continuously variable transmission are achieved by overlapping closing of the clutches 25 and 26 without any interruption in tractive force. The clutches 25 and 26 can be arranged both as multiple disk clutches or also as interlocking transfer elements such as jaw clutches. It needs to be ensured however that during the changeover process both involved clutches are able to transfer torque and the clutches can also be opened under load.

The embodiments according to the speed diagrams of FIGS. 8, 9 and 18 show ranges of pure power transmission via the variator unit 5 in a speed window of approx. −10 kph up to approx. +10 kph. In the example according to the speed diagram according to FIG. 9, this speed range is between −7 kph and +7 kph at the respectively assumed maximum input speed.

Embodiments of the transmission are shown in the FIGS. 11 to 17 and 20 and 21 in which the arrangement of the planetary gear sets is reversed in comparison with the variants shown in FIGS. 1 to 7 and 10. The purely hydrostatic drive occurs in these variants via the direct planetary drive. In the power-split areas the power transfer occurs via the reversing planetary gear set. The functionality is the same in both illustrated embodiments.

FIGS. 10 and 20 show embodiments which enable a continuous and uninterrupted drive over the entire gear ratio range. As a result of the coupling of the ring gear 19 via the hollow shaft 30 and the spur-gear stage 29, synchronous speed is reached in clutch 28 at high output speed in the first power-split area in the case of a respective choice of the gear ratios and the changeover from the first to the second power-split area can occur analogously to the changeover from pure variator drive to the adjacent power-split areas at synchronous speed.

FIG. 21 shows an extension over the embodiment shown in FIG. 20 in the form of a reversing stage 31, with which the direction of speed of the shaft 32 can be influenced via a synchronization unit. The changeover of the direction of rotation occurs when the clutches 25 and 28 are opened when the transmission has been shifted to neutral position or when the clutch 20 is closed and the drive occurs only via the variator 5. The direction of rotation of the shaft 32 is adjusted via a control unit according to the desired direction of drive. FIG. 22 shows the speeds of the relevant transmission components by way of example in the case of arrangement of the transmission according to FIG. 21. The reference numerals of FIG. 22 correspond to the reference numerals of FIG. 21.

The advantages that can mainly be achieved by this invention are as follows:

- The vehicle is only driven via the variator 5 in the starting range or in the lower speed range. All functional advantages of hydrostatic, electric and generic variator systems which allow a continuous adjustment of the output speed in both directions of rotation can thus be utilized.
- A high spread in the summing planetary gear 12 can be achieved in the power-split areas, so that a lower number of mechanical speed steps is necessary than would be required when using only one summing planetary gear set.
- A high gear ratio in the summing planetary gear 13 can be achieved, so that a high tractive force can be achieved already with variators of small dimension.
- The arrangement of the transmission is simpler and can be produced in a more cost-effective manner than is the case with comparable transmissions of the state of the art.
- The purely hydrostatic or electric operation at low speeds allows soft starting, change of direction of drive and operation of the vehicle at creeping speeds without any slipping clutches.
- The internal combustion engine can be operated with favorable engine characteristics as a result of continuous adjustment of the gearing.

A good overall efficiency is achieved by low power transfer via the variator 5 during operation in the power-split areas.

In the embodiments according to FIGS. 1 and 4, no mechanical reverse gear is necessary because the reversal in the direction of rotation of the output shaft 8 can occur exclusively via the variator 5. This applies analogously to embodiments with two, three or more forward gears.

In the embodiments according to FIGS. 10, 20 and 21, it is ensured that all changeovers can be made at synchronous speeds.

The invention claimed is:

1. A superposition transmission for use in vehicles and work machines having wheels and an internal combustion engine, the superposition transmission comprising:
    a control device comprising a variator, with which direction of rotation of an output shaft driving the wheels can be changed and with which speed of the output shaft can be influenced in an infinitely variable manner;
    an input shaft driven by the internal combustion engine and connected via a spur-gear stage with an input shaft of the variator, said variator comprising an adjusting device having a variator output shaft;
    wherein the variator output shaft is connected with sun gears of mutually parallel arranged summing planetary gears either via a spur-gear stage or directly;
    wherein the superposition transmission outputs via a carrier arranged as a planet carrier for all planetary wheels in all driving speeds and all driving ranges; and
    wherein said carrier is rigidly connected with the output shaft.

2. A superposition transmission according to claim 1, wherein the output occurs depending on a vehicle speed either via the variator or via a first power-split area or via further power-split areas, with clutches providing interruption-free transfer of tractive force from the output via the variator with fixed clutch and utilization of the planet wheels for the power-split output from the input shaft via a first ring gear by utilizing the planet wheels in the case of power-split output to the carrier and to the output shaft.

3. A superposition transmission according to claim 1, wherein the output occurs depending on the vehicle speed either via the variator or via a first power-split area or via further power-split areas, with clutches providing interruption-free transfer of tractive force from the output via the variator with fixed clutch and utilization of the planet wheels for the power-split output from the input shaft via a first ring gear by utilizing the planet wheels in the case of power-split output to the carrier and to the output shaft.

4. A superposition transmission according to claim 1, wherein the variator is arranged either as a hydrostatic unit, consisting of a variable displacement pump and a hydraulic motor as a constant motor, or as a hydrostatic unit, comprising a variable displacement pump and a variable displacement motor, in the form of axial piston machines or vane units, or as an electric variator in the form of a combination of a generator and electric motor with associated inverters.

5. The superposition transmission of claim 4, wherein the variator includes one or more hydraulic or electric storage systems.

6. A superposition transmission according to claim 1, wherein the sun gears of the summing planetary gears are connected with each other in a torque-proof manner via a shaft, one of the sun gears being in operative connection with a set of planetary gears and another of the sun gears being in operative connection with a set of reversing planetary gears, the set of planetary gears meshing with a second ring gear and the set of reversing planetary gears meshing with a first ring gear, and the first ring gear being fixable in a torque-proof manner to a housing via a clutch or a brake.

7. A superposition transmission according to claim 5, wherein slipping clutches are provided for a changeover from a first to a second power-split area, with change in speed of the second ring gear being compensated completely or partially by influencing speed of the sun gears during the changeover.

8. A superposition transmission according to claim 7, wherein the first ring gear is connected with a clutch via respective transfer elements, and gear ratios on the spur-gear stages are such that the changeover from the first power-split area to the second power-split area occurs at synchronous speed in the clutch.

9. A superposition transmission according to claim 7, wherein a shaft rotatable in two directions of rotation is provided, and an infinitely variable and interruption-free drive occurs via the reversing stage in both driving directions over the entire gear ratio range, with which the direction of rotation of the shaft is controlled via a synchronization unit, and the changeover in the direction of rotation occurs with opened clutches when the transmission is shifted to neutral, or when the clutch is closed and the drive occurs only via the variator.

10. A superposition transmission according to claim 1 wherein the sun gears of the summing planetary gears are connected with each other in a torque-proof manner via a shaft, one of the sun gears being in operative connection with a set of reversing planetary gears and another of the sun gears being in operative connection with a set of planetary gears, the set of planetary gears meshing with a first ring gear and the set of reversing planetary gears meshing with a second ring gear, and the first ring gear being fixable in a torque-proof manner to a housing via a clutch or a brake.

11. A superposition transmission according to claim 10, wherein slipping clutches are provided for a changeover from a first to a second power-split area, with change in speed of the second ring gear being compensated completely or partially by influencing speed of the sun gears during the changeover.

12. A superposition transmission according to claim 1, wherein the summing planetary gears have gear ratios selected such that a changeover from pure drive via the variator to other driving ranges occurs without any interruption of tractive force at synchronous points.

13. A superposition transmission according to claim 1, wherein the summing planetary gears comprise a first and second planetary gear set, each planetary gear set having a respective gear ratio, wherein the gear ratio in the first planetary gear set is larger than the gear ratio in the second planetary gear set.

14. A superposition transmission according to claim 1, wherein the variator is arranged as a compact unit in stretched configuration with variable displacement pump and hydraulic motor arranged back-to-back, or as a compact unit with adjacently arranged variable displacement pump and hydraulic motor in Z or U arrangement, or as separate hydrostatic units in resolved configuration.

15. A superposition transmission according to claim 1, wherein the adjusting device comprises a variable displacement pump and a hydraulic motor.

16. A superposition transmission according to claim 1, wherein the adjusting device comprises an electric motor.

17. A superposition transmission for a machine having wheels moving the machine and an internal combustion engine, said superposition transmission comprising:
    a transmission input shaft adapted to be rotationally driven by the internal combustion engine;

a transmission output shaft operatively associated with the wheels so as to drive said wheels so as to move the machine;

a first planetary gear having a first sun gear, a first set of planetary gears meshed with the first sun gear, and a ring gear meshed with the first set of planetary gears;

a second planetary gear supported parallel to the first planetary gear having a second sun gear, a second set of planetary gears meshed with the second sun gear and a second ring gear meshed with the second set of planetary gears;

a planet carrier carrying first and second sets of planetary gears for rotation thereon, said planet carrier being fixedly secured to the transmission output shaft so that the transmission output shaft rotates therewith;

first and second power connections of the transmission input shaft with the planetary gears;

said first power connection comprising a control device, the control device including a variator with a variator input shaft and a variator output shaft, said variator input shaft being operatively associated with and driven by the transmission input shaft, the variator input shaft being connected with the variator output shaft such that rotation of the output shaft is driven responsive to rotation of the input shaft, the variator providing control of direction of rotation of the variator output shaft and for adjustment of rotational speed of the variator output shaft;

the variator output shaft being connected through a spur-gear stage or directly with a shaft carrying the first sun gear of the first planetary gear and the second sun gear of the second planetary gear so that rotation of the variator output shaft drives rotation of said first and second sun gears; and said second power connection connecting the transmission input shaft with the ring gear of the first planetary gear so that the transmission input shaft is selectively linked with the first ring gear so as to drive the first ring gear or to rotate independently thereof.

18. The superposition transmission of claim 17, wherein the second ring gear is supported so that said second ring gear selectively rotates or is prevented from rotating relative to a housing of the transmission; and wherein the second ring gear is permitted to rotate when the first ring gear is driven by the transmission input shaft, and the second ring gear does not rotate when the first gear ring rotates independently of the transmission input shaft.

19. The superposition transmission of claim 18, wherein said second set of planetary gears comprises a set of inner planetary gears meshing with the second sun gear and a set of outer planetary gears meshing with and rotating reverse to the inner planetary gears, the outer planetary gears meshing with the second ring gear.

20. The superposition transmission of claim 19, wherein the transmission input shaft is linked to the first ring gear via a clutch having a rotatable clutch input shaft connected with the transmission input shaft so as to be driven thereby and a rotatable clutch output shaft connected with the first ring gear so as to rotate responsive to rotation thereof, wherein said clutch engages at a synchronization point wherein the clutch input and clutch output shafts are rotating at equal rates.

21. The superposition transmission of claim 17, wherein the transmission input shaft is connected with the variator input shaft by a spur gear.

* * * * *